United States Patent [19]

Kawamura et al.

[11] Patent Number: 5,337,872
[45] Date of Patent: Aug. 16, 1994

[54] SYNCHRONIZER RING

[75] Inventors: Osamu Kawamura, Tochigi; Shigeo Murata, Sagamihara, both of Japan

[73] Assignees: Nippon Piston Ring Co., Ltd.; Nissan Motor Co., Ltd., Japan

[21] Appl. No.: 901,174

[22] Filed: Jun. 19, 1992

[30] Foreign Application Priority Data

Jun. 21, 1991 [JP] Japan .................. 3-150500

[51] Int. Cl.⁵ ............... F16D 23/02; F16D 69/02
[52] U.S. Cl. ................. 192/107 M; 428/614; 428/674; 192/53 F
[58] Field of Search ........... 192/53 E, 53 F, 107 M; 420/477, 478, 479, 480; 428/614, 674, 675, 676, 677

[56] References Cited

U.S. PATENT DOCUMENTS

| | | | |
|---|---|---|---|
| 2,191,460 | 2/1940 | Fisher | 192/107 M |
| 2,775,323 | 12/1956 | English | 192/107 M X |
| 2,922,221 | 1/1960 | Morton et al. | 192/107 M X |
| 4,311,524 | 1/1982 | Genkin et al. | 192/107 M X |
| 4,874,439 | 10/1989 | Akutsu | 192/107 M X |

FOREIGN PATENT DOCUMENTS

| | | | |
|---|---|---|---|
| 79732 | 5/1983 | European Pat. Off. | 192/107 M |
| 3705661 | 9/1989 | Fed. Rep. of Germany . | |
| 46-15043 | 4/1971 | Japan . | |
| 64-12134 | 1/1989 | Japan | 192/53 F |

*Primary Examiner*—Richard M. Lorence
*Attorney, Agent, or Firm*—Parkhurst, Wendel & Rossi

[57] ABSTRACT

A synchronizer ring for performing synchronous sliding operation with and separating operation from a rotating object member, comprises a ring body having a sliding surface slidable in contact with the object member and a copper alloy flame-coated film formed on the sliding surface. The copper alloy flame-coated film has a Zn equivalent of 40 to 65, a surface porosity of 5 to 30 volume % and a thickness of 70 to 200 μm. The copper alloy flame-coated film also may have a surface roughness (Rz) of 20 to 60 μm, and a ceramic content of 5 to 30 weight %.

10 Claims, 4 Drawing Sheets

SYNCHRONIZER RING

BACKGROUND OF THE INVENTION

This invention relates to a synchronizer ring stable in quality having a superior friction characteristic and an improved abrasion resisting property and durability.

A synchronizer ring is conventionally utilized for a synchromesh transmission, for example.

The synchronizer ring acts as a friction ring performing a synchronous sliding motion with a rotating opposite object member such as a taper cone and performing a separating motion from the taper cone of a clutch gear, thus significantly serving as a member for rendering equal peripheral speeds of two gears which are to be engaged with each other.

The synchronizer ring of prior art has a structure in which a ring body having an outer peripheral portion on which a plurality of gear teeth, which are engaged with another rotating member, are formed with equally spaced relationship in the circumferential direction. The ring body is further provided with an inner peripheral portion contacting an opposite object such as the taper cone. A plurality of annular grooves are formed to the inner peripheral portion in its circumferential direction for imparting friction force, and at least one groove across the annular grooves may be formed thereto as occasion demands for escaping lube oil. In one type of such synchronizer ring, a key groove to which a synchronizer key is fitted is formed to the outer peripheral portion of the ring body. The synchronizer ring is generally made of brass (Cu-Zn alloy).

For the synchronizer ring of the structure described above, it is required to have an inner peripheral portion contacting another rotating member having an excellent friction characteristic and abrasion resisting property in addition to high mechanical strength and accuracy. Particularly, in the use for speed change gears or gear mechanisms for automobiles, it has been required for the synchronizer ring to have further improved friction characteristic and abrasion resisting property in accordance with recent requirement of a transmission mechanism of an automobile with high grade and performance as well as its improved maneuverability.

In accordance with such recent requirement, various studies have been made for providing a synchronizer ring having an inner peripheral portion having further improved friction characteristic and abrasion resisting property in comparison with the conventional synchronizer ring made of brass (Cu-Zn alloy).

For example, there is provided a synchronizer ring having an inner peripheral portion on which is formed, by a thermal spraying method, a layer formed of a material composed of metal, ceramic and oxide uniformly mixed with and fused to each other. Furthermore, there is also known a method of manufacturing a friction ring having an inner peripheral portion on which is formed by a flame jetting method a friction lining composed of a sintered powder material including metal powder component of 80 weight % and non metal powder material of 20 weight %.

However, the conventional synchronizer rings described above or manufactured by the method described above have not yet met desired friction characteristics and abrasion resisting properties. Furthermore, the conventional synchronizer rings suffer from inadequate strength due to insufficient diffusion of the respective metal components having instable qualities due to unevenness of materials of flame-coated film. Moreover, incompletely fused particles or scattering rebounding particles in the flame form on the surface layer of the flame-coated film, and the adhesion of theses particles onto the surface layer makes the surface of the film coarse. Over time, the friction characteristic of the ring changes and abrasion of parts of a transmission system of an automobile, for example, results from particles dropped down from the film surface. These also provide significant problems. In the conventional art, grinding working or cutting working is performed to the flame-coated film surface for the purpose of reducing the surface coarseness or roughness of the flame-coated film, but such workings are expensive and not economical.

SUMMARY OF THE INVENTION

An object of this invention is to substantially eliminate defects or drawbacks encountered in the prior art described above and to provide a synchronizer ring having a superior friction characteristics, a sufficient abrasion resisting property and a sufficient mechanical strength and being capable of providing a stable quality.

Another object of this invention is to provide a synchronizer ring provided with a flame-coated film to which no grinding operation or cutting operation is needed.

These and other objects of this invention can be achieved according to this invention by providing, in one aspect, a synchronizer ring for performing a sliding operation with and separating operation from a rotating object member, comprising a ring body having a sliding surface slidable in contact with the object member and a copper alloy flame-coated film formed on the sliding surface, the copper alloy flame-coated film having a Zn equivalent of 40 to 65, a surface porosity of 5 to 30% and a thickness of 70 to 200 $\mu$m.

In a preferred embodiment, the Zn equivalent of the copper alloy flame-coated film is 45 to 55, the surface porosity thereof is of 10 to 25% and the thickness thereof is of 90 to 120 $\mu$m.

In another aspect of this invention, there is provided a synchronizer ring for performing synchronous sliding operation with and separating operation from a rotating object member, comprising a ring body having a sliding surface slidable in contact with the object member and a copper alloy flame-coated film formed on the sliding surface, the copper alloy flame-coated film having a Zn equivalent of 40 to 65, a surface porosity of 5 to 30%, a surface roughness (Rz) of 20 to 60 $\mu$m and a thickness of 70 to 200 $\mu$m.

In a preferred embodiment, the Zn equivalent of the copper alloy flame-coated film is preferably of 45 to 55, the surface porosity thereof is preferably of 10 to 25%, the surface roughness thereof is preferably of 30 to 55 $\mu$m and the thickness thereof is preferably of 90 to 120 $\mu$m.

In a further aspect of this invention, there is provided a synchronizer ring for performing synchronous sliding operation with and separating operation from a rotating object member, comprising a ring body having a sliding surface slidable in contact with the object member and a copper alloy flame-coated film formed on the sliding surface, the copper alloy flame-coated film having a Zn equivalent of 40 to 65 and a ceramic content of 5 to 30 weight %.

In a preferred embodiment, the Zn equivalent of the copper alloy flame-coated film is of 45 to 55 and the ceramic content of 7 to 20 weight %.

In a still further aspect of this invention, there is provided a synchronizer ring for performing synchronous sliding operation with and separating operation from a rotating object member, comprising a ring body having a sliding surface slidable in contact with the object member and a copper alloy flame-coated film formed on the sliding surface, the copper alloy flame-coated film having a Zn equivalent of 40 to 65, a ceramic content of 5 to 30 weight % and a surface roughness (Rz) of 20 to 60 μm.

In a preferred embodiment, the Zn equivalent of the copper alloy flame-coated film is of 30 to 55 μm and the ceramic content of 7 to 20 weight %.

According to the present invention described above, the synchronizer ring provided with the copper alloy flame-coated film described above has improved friction characteristics and superior synchronism and separation properties with respect to the opposite object member such as taper cone of a clutch gear. In addition, the synchronizer ring provides a sufficient abrasion resisting property and durability, thus being stable in quality. According to this invention, no grinding work or cutting work to the flame-coated film is required.

Further characteristic features and effects of this invention will be made more clear by way of preferred embodiments in conjunction with the accompanying drawings.

DESCRIPTION OF THE PREFERRED EMBODIMENT

Figure 1:
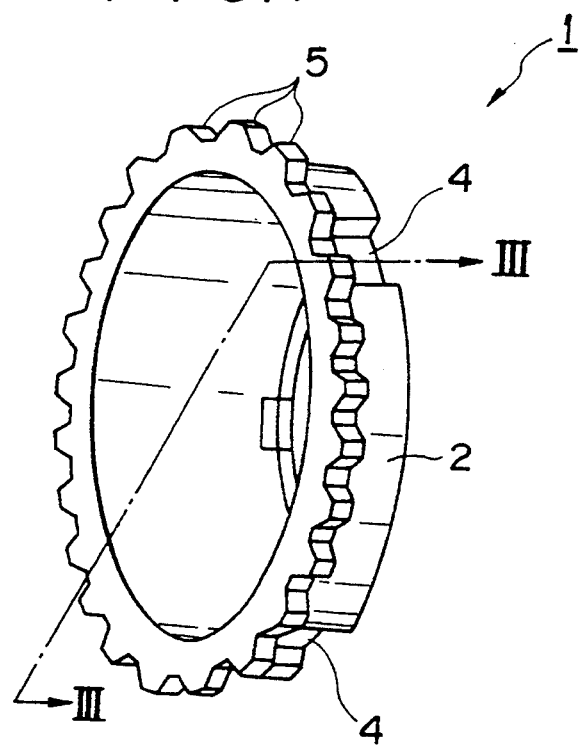
FIG. 1 is a perspective view of a synchronizer ring to which this invention is applicable.
Figure 2:
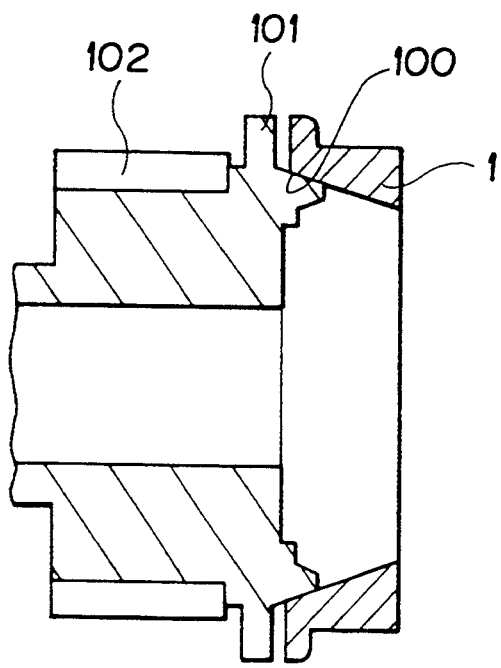
FIG. 2 is a longitudinal sectional view showing an engaged state of the synchronizer ring with an object member such as taper cone of a clutch gear.

FIG. 1 is a perspective view showing one example of a synchronizer ring to which this invention is applicable. The shown synchronizer ring 1 has a structure in which an annular ring body 2 having outer peripheral portion on which a plurality of gear teeth 5, which are for engagement with another rotating member, are formed to be equally spaced apart in the circumferential direction. The ring body 2 is further provided with an inner peripheral surface portion contacting an object member such as a taper cone of a clutch gear such as shown in FIG. 2. A plurality of annular grooves may be formed at the inner peripheral portion in its circumferential direction for imparting friction force, and at least one groove across the annular grooves may be also formed thereto as occasion demands for escaping lubricating oil. In one type of such synchronizer ring, key groove 4 to which a synchronizer key is fitted is formed at the outer peripheral portion of the ring body 2.

Referring to FIG. 2, a part of a speed reduction gear arrangement, having a clutch gear 101, a speed reduction gear 102 and a taper cone 100 as an object member which is engaged with the synchronizer ring of the type shown in FIG. 1. The object member, i.e., taper cone 100, engages with the inner peripheral surface of the synchronizer ring 1 in the operating state.

Figure 3:
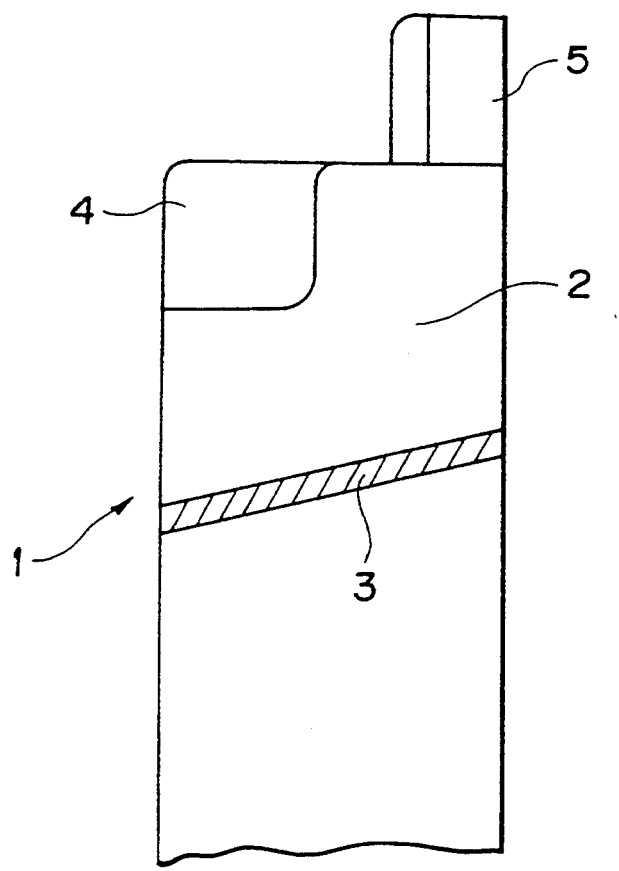
FIG. 3 is a sectional view taken along the line III—III in FIG. 1.

FIG. 3 is a schematic partial sectional view of the synchronizer ring 1 of FIG. 1, and with reference to FIG. 3, the synchronizer ring 1 is composed of a ring body 2 and a copper alloy flame-coated film 3 formed on the inner peripheral surface of the ring body 2.

The ring body 2 is formed of, for example, various copper series alloys such as Cu-Zn series, Cu-Ni series, Cu-Al series, Cu-Sn series or Cu-Si series alloy, or iron series alloys such as Cr steel, Cr-Mo steel, Ni-Cr steel, Ni-Cr-Mo steel, Mn steel or Mn-Cr steel alloys.

The copper alloy flame-coated film 3 is formed of an alloy mainly consisting of Cu including more than two kinds of components selected from the group of Zn, Mn, Fe Pb, Sn, Ni, Si, Mg, Cd, Al and Co. The copper alloy flame-coated film includes Zn equivalent of 40 to 65, preferably 45 to 55. The Zn equivalent Eq (Zn) is calculated from the following equation. Eq $(Zn) = \{[Zn(\%) + \Sigma q.t]/[Cu(\%) + Zn(\%) + \Sigma q.t]\} \times 100$, wherein the symbol $\Sigma q.t$ is a product of contents (%) of the respective alloy elements (excluding Zn and Cu) contained in the copper alloy and t value, described hereunder.

That is, the t values of the respective alloy elements are Zn(1.0), Mn(0.5), Fe(0.9), Pb(1.0), Sn(2.0), Ni(−1.3), Si(10.0), Mg(2.0), Cd(1.0), Al(6.0) and Co(0.5).

The copper alloy flame-coated film 3 having the Zn equivalent within the above described range has a superior friction characteristic and abrasion resisting property, by the synergistic effect of (1) the generation of micromatic plastic flow of a soft phase ($\alpha$ phase), (2) the uniform dispersion of a hard phase ($\beta$ phase, $\gamma$ phase), and (3) oil film breakage due to holes. Namely, this is based on the fact that in general, a copper alloy increases its hardness and strength by precipitation of the $\beta$ phase, $\gamma$ phase, $\eta$ phase, and $\epsilon$ phase onto the soft homogeneous $\alpha$ phase, and the precipitation amounts of the respective phases on the phase is determined by the Zn equivalent of Zn or other alloy elements.

In the case of the Zn equivalent being less than 40, precipitation of the hard phase, such as $\beta$ phase, is inadequate, thereby providing low hardness. Moreover, the micromatic plastic flow of the copper alloy is too high upon sliding with the object member, such as taper cone, and abrasion is also too high. On the contrary, when the Zn equivalent exceeds 65, such micromatic plastic flow is inadequate and a necessary friction coefficient is not obtained and, in some cases, the film becomes brittle. The hardness (Hv) of the copper flame-coated film 3 of the Zn equivalent is usually of a value in a range of 170 to 280. When the hardness (Hv) is less than 170, friction may become too high. When hardness exceeds 280, the necessary friction coefficient may be not obtained and the film may become brittle.

Holes are usually formed in the copper alloy flame-coated film 3, and the holes act to break the oil film and as an oil bank to increase the dynamic friction coefficient in association with the object taper cone (pressure apply or pressure reduction to the oil film), to improve synchronism, to reduce static friction coefficient and to improve releasing ability.

An occupying ratio of the holes with respect to the surface of the copper alloy flame-coated film 3, i.e., surface porosity, is usually 5 to 30% and preferably of 10 to 25%. In the case of the surface porosity being less than 5%, the dynamic friction coefficient increases and hence the static friction coefficient reduces. Thus, the above described functions are insufficiently attained. In the case of the surface porosity being over 30%, the copper alloy flame-coated film 3 may become insufficient.

It is desired that the copper alloy flame-coated film 3 has a surface roughness (Rz) of the sliding surface in a range of 20 to 60 μm, preferably in a range of 30 to 55 μm. When surface roughness (Rz) is in this range, abrasion of the object taper cone can be reduced and the degradation or change of the friction characteristic due to wear over time, revolutions, pressure, oil temperature or the like can be suppressed, and the superior friction characteristic can be hence maintained for a long time.

In order to set the surface roughness (Rz) in the above range, a brushing treatment will be effected to the surface, i.e., sliding surface, of the copper alloy flame-coated film 3. For such brushing treatment, a metallic or non metallic brush including hard particles having a hardness (Hv) more than 1000 will be preferably utilized. As a practical example, a nylon brush including SiC grains, for example, having a hardness (Hv) of 2600 will be proposed.

In the case of the surface roughness (Rz) being less than 20 μm, such brushing treatment requires much time, resulting in manufacturing cost increase. On the contrary, in the case of the surface roughness being over 60 μm, the aforementioned function for suppressing the degradation or change of the friction characteristic may be attained.

The copper alloy flame-coated film 3 may be composed of a copper alloy of the hardness (Hv) in a range of 170 to 280 and ceramic particles of 5 to 30 weight %, preferably 7 to 20 weight %, dispersed uniformly in the copper alloy. It will be preferred to utilize, as such ceramic particles, an oxide including at least one element selecting from a group consisting of Si, B, Al, Mn, Cu, Co, Ni and Na and having a softening point in a range of 450° to 650° C. More specifically, $SiO_2$, NiO, MnO, $Na_2O$, $Al_2O_3$, $B_2O_3$, $RO_2$ (symbol R denotes a rare earth element herein), $K_2O$, MgO or $ZnO_2$ and combination thereof may be utilized.

The copper alloy flame-coated film 3 in which the ceramic particles are uniformly dispersed in the weight percentage as described above can provide an increased dynamic friction coefficient and hence an improved friction characteristic. However, when the ceramic particles are present in an amount of less than 5 weight %, self abrasion overexceeds and the abrasion resisting property may be degraded. When the ceramic particles are over 30 weight %, the abrasion of the object cone may overexceed. The copper alloy flame-coated film 3 in which such ceramics particles are uniformly dispersed in the described weight percentage usually has a hardness (Hv) of 250 to 400. In the case of this hardness being less than 250, the abrasion resisting property may become short and in the case of this hardness being over 400, the abrasion of the object taper cone progresses and the copper alloy flame-coated film 3 itself will become brittle.

The copper alloy flame-coated film 3 is formed to usually have a thickness of 70 to 200 μm and, preferably, 90 to 120 μm. In the case of this thickness being less than 70 μm, the hole quantity becomes short and, in some cases, a required friction characteristic will be not achieved. On the contrary, in the case of this thickness being over 200 μm, the copper alloy flame-coated film 3 liable to peel from the ring body 2, resulting in the degradation of the durability of the synchronizer ring itself and hence involving manufacturing cost increase.

The synchronizer ring of the structure and characteristics described above will be manufactured in the following manner.

Namely, a ring body 2 formed in a predetermined shape by an ordinary method is first prepared. A powder of copper alloy and ceramic particles uniformly dispersed therein is then flame-coated on an inner peripheral surface of the ring body by a plasma flame coating method or flame coating method, for example. The powders may be preferably obtained by an atomizing method, whereby the respective components are uniformly dispersed. After the flame-coated film 3 having a predetermined thickness has been formed on the inner peripheral surface of the ring body 2, the surface finishing is performed so that the surface roughness (Rz) of the flame-coated film 3 is preferably in a range of 20 to 60 μm by the brushing treatment. The synchronizer ring thus manufactured has an increased dynamic friction coefficient, an improved synchronism, a decreased static friction coefficient, an improved removability and a sufficient abrasion resisting property.

The present invention will be further described concretely by way of preferred embodiments.

EMBODIMENT 1

A synchronizer ring was formed in the following manner. Namely, a copper alloy flame-coated film was formed by effecting a plasma flame coating treatment, on the inner peripheral surface (sliding surface with respect to a taper cone as an object member) of a ring body made of a high strength brass (corresponding to a product of JIS HBsC3), with material powders (Atomized powders) consisting of copper alloy of 100 mesh structure (30.1%Zn-4.2%Al-2.2%Ni1.1%Si-0.96%Fe-0.98%Mn balance of Cu, and Zn equivalent: 50.8). The flame-coated film had a hardness (Hv) of 215, a surface porosity of 20%, a surface roughness (Rz) of 72 μm and a thickness of 100 μm.

With respect to the thus manufactured synchronizer ring, peel strength, a friction characteristic and abrasion quantity of the copper alloy flame-coated film were evaluated in accordance with the following conditions.

Peel Strength: On the basis of JIS H 8666 "Ceramics flame-coated Testing Method".

Figure 5:
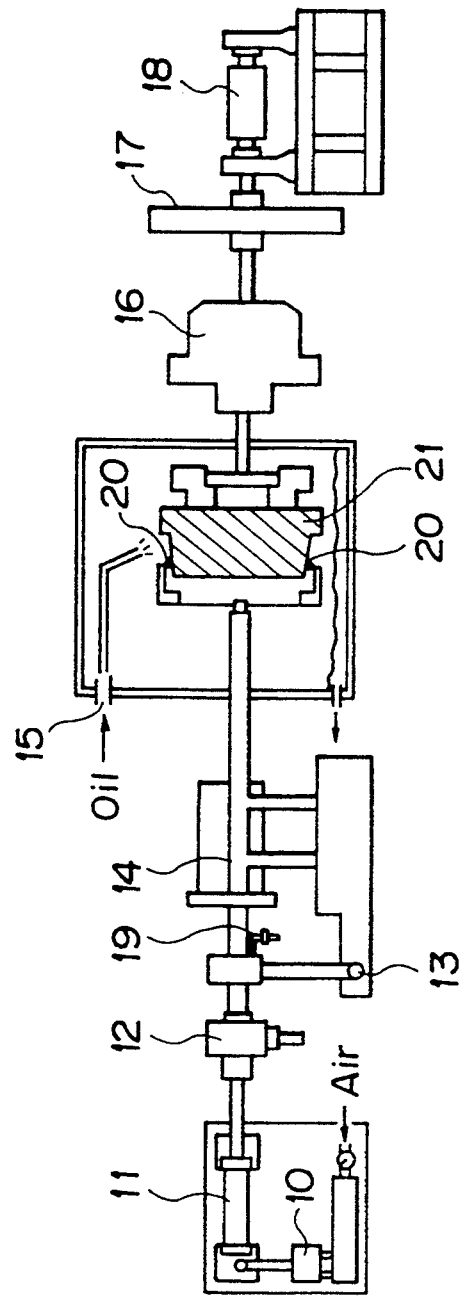
FIG. 5 is an illustrated view showing a synchronizer ring unit abrasion testing machine utilized for the embodiments according to this invention.

Friction Characteristic and Abrasion Amount: These were measured under the following conditions by using a synchronizer ring unit abrasion testing machine of the structure shown in FIG. 5.

Test Condition: Constant Speed Slip Mode.
Press Load: 80 kgf.
Revolution Numbers: 1200 rpm.
Pressing Time: 0.2 sec.
Utilized Lubrication Oil: 75w-90 (80° C.)
Oiling Rate: 0.6 liter/min.
Utilized Object Member:
  Substance: SCr420 (surface hardness (Hv) 580)
  Shape: Cone Taper (cone angle: 6°40″)
Engaging and Disengaging Numbers: 5000

Further, the synchronizer ring unit testing machine utilized for these embodiments is itself of a known structure generally including an electromagnetic valve 10, an air cylinder 11, a pressing load cell 12, a friction load cell 13, a ball bushing 14, a lubrication oil inlet 15, an electromagnetic clutch 16, a flywheel 17, and an AC servomotor 18. The reference numerals 20 and 21 denote a synchronizer ring and taper cone, respectively, and the abrasion amount was measured by an abrasion amount measuring unit 19.

The composition of the copper alloy flame-coated film and the measured results are shown in the following Tables 1 and 2.

EMBODIMENTS 2-22

These embodiments were performed in the manner substantially identical to that performed with respect to the Embodiment 1 except for a point that the material powders used in the Embodiment 1 were substituted with material powders having composition shown in Tables 1 and 3.

In the Embodiments 11 to 21, ceramic particles [($SiO_2$-$B_2O_3$-$R_2O$-$Al_2O_3$) 80%+(CaO-CuO-$Na_2O$) 20%] were added to the material powders, and in the Embodiments 7 to 12 and 20 to 22, the brushing treatment was performed to the surfaces of the copper alloy flame-coated films by utilizing a nylon brush (wire diameter: 0.6 mm $\phi$) including SiC grain particle (hardness Hv: 2600).

The compositions of the copper alloy flame-coated films and the measurement results are shown in Table 1 to 4.

COMPARATIVE EXAMPLE 1

A synchronizer ring was manufactured by the manner substantially identical to that performed with respect to the Embodiment 1 except for a point that material powders having composition shown in Table 3 and having the Zn equivalent 35.0 were utilized in place of the material powders used in the Embodiment 1, and the evaluation to the thus manufactured synchronizer ring was made.

The compositions of the copper alloy flame-coated films and the measurement results are shown in Tables 3 and 4.

COMPARATIVE EXAMPLE 2

A synchronizer ring was manufactured by the manner substantially identical to that performed with respect to the Embodiment 1 except that material powders having composition shown in Table 3 and having the Zn equivalent 69.0 were utilized in place of the material powders used in the Embodiment 1, and the evaluation to the thus manufactured synchronizer ring was made.

The compositions of the copper alloy flame-coated films and the measurement results are shown in Tables 3 and 4.

COMPARATIVE EXAMPLE 3

A synchronizer ring was manufactured by the manner substantially identical to that performed with respect to the Embodiment 1 except that material powders having composition shown in Table 3 and having the porosity of 4% were utilized in place of the material powders used in the Embodiment 1, and the evaluation to the thus manufactured synchronizer ring was made.

The compositions of the copper alloy flame-coated films and the measurement results are shown in Tables 3 and 4.

COMPARATIVE EXAMPLE 4

A synchronizer ring was manufactured by the manner substantially identical to that performed with respect to the Embodiment 1 except that material powders having composition shown in Table 3 and having the porosity of 35% were utilized in place of the material powders used in the Embodiment 1, and the evaluation to the thus manufactured synchronizer ring was made.

The compositions of the copper alloy flame-coated films and the measurement results are shown in Tables 3 and 4.

COMPARATIVE EXAMPLE 5

A synchronizer ring was manufactured by the manner substantially identical to that performed with respect to the Embodiment 1 except for a point that the thickness of the copper alloy flame-coated film was changed from 100 $\mu$m to 250 $\mu$m, and the evaluation to the thus manufactured synchronizer ring was made.

The compositions of the copper alloy flame-coated films and the measurement results are shown in Tables 3 and 4.

COMPARATIVE EXAMPLE 6

A synchronizer ring was manufactured by the manner substantially identical to that performed with respect to the Embodiment 1 except that the ceramic particles were added in ratio shown in Tables 3 to the material powders of the same composition as that of the material powders used in the Embodiment 1, and the evaluation to the thus manufactured synchronizer ring was made.

The compositions of the copper alloy flame-coated films and the measurement results are shown in Tables 3 and 4.

COMPARATIVE EXAMPLE 7

A synchronizer ring was manufactured by the manner substantially identical to that performed with respect to the Embodiment 2 except that the ceramic particles were added in ratio shown in Table 3 to the material powders of the same composition as that of the material powders used in the Embodiment 2, and the evaluation to the thus manufactured synchronizer ring was made.

The compositions of the copper alloy flame-coated films and the measurement results are shown in Tables 3 and 4.

COMPARATIVE EXAMPLE 8

A synchronizer ring was manufactured by the manner substantially identical to that performed with respect to the Embodiment 3 except that the ceramic particles were added in ratio shown in Table 3 to the material powders of the same composition as that of the material powders used in the Embodiment 3, and the evaluation to the thus manufactured synchronizer ring was made.

The compositions of the copper alloy flame-coated films and the measurement results are shown in Tables 3 and 4.

COMPARATIVE EXAMPLE 9

A synchronizer ring was manufactured by the manner substantially identical to that performed with respect to the Embodiment 4 except that the ceramic particles were added in ratio shown in Table 3 to the material powders of the same composition as that of the material powders used in the Embodiment 4, and the evaluation to the thus manufactured synchronizer ring was made.

The compositions of the copper alloy flame-coated films and the measurement results are shown in Tables 3 and 4.

COMPARATIVE EXAMPLE 10

A synchronizer ring was manufactured by the manner substantially identical to that performed with respect to the Embodiment 5 except that the ceramic particles were added in ratio shown in Table 3 to the material powders used in the Embodiment 5 and the thickness of the copper alloy flame-coated film was changed from 250 μm to 65 μm, and the evaluation to the thus manufactured synchronizer ring was made.

The compositions of the copper alloy flame-coated films and the measurement results are shown in Tables 3 and 4.

COMPARATIVE EXAMPLE 11

A synchronizer ring was manufactured by the manner substantially identical to that performed with respect to the Embodiment 5 except that the ceramic particles were added in ratio shown in Table 3 to the material powders of the same composition as that of the material powders used in the Embodiment 5, the brushing treatment as performed with reference to the Embodiment 7 was performed to the surface of the copper alloy flame-coated film, and the evaluation to the thus manufactured synchronizer ring was made.

The compositions of the copper alloy flame-coated films and the measurement results are shown in Table 3 and 4.

COMPARATIVE EXAMPLE 12

A synchronizer ring was formed of a high strength brass of the compositions shown in Table 3 without forming a flame-coated film, and the evaluation to the thus manufactured synchronizer ring was made.

The compositions of the high strength brass and the measurement results are shown in Tables 3 and 4.

ANALYSIS OF RESULTS

Figure 4:
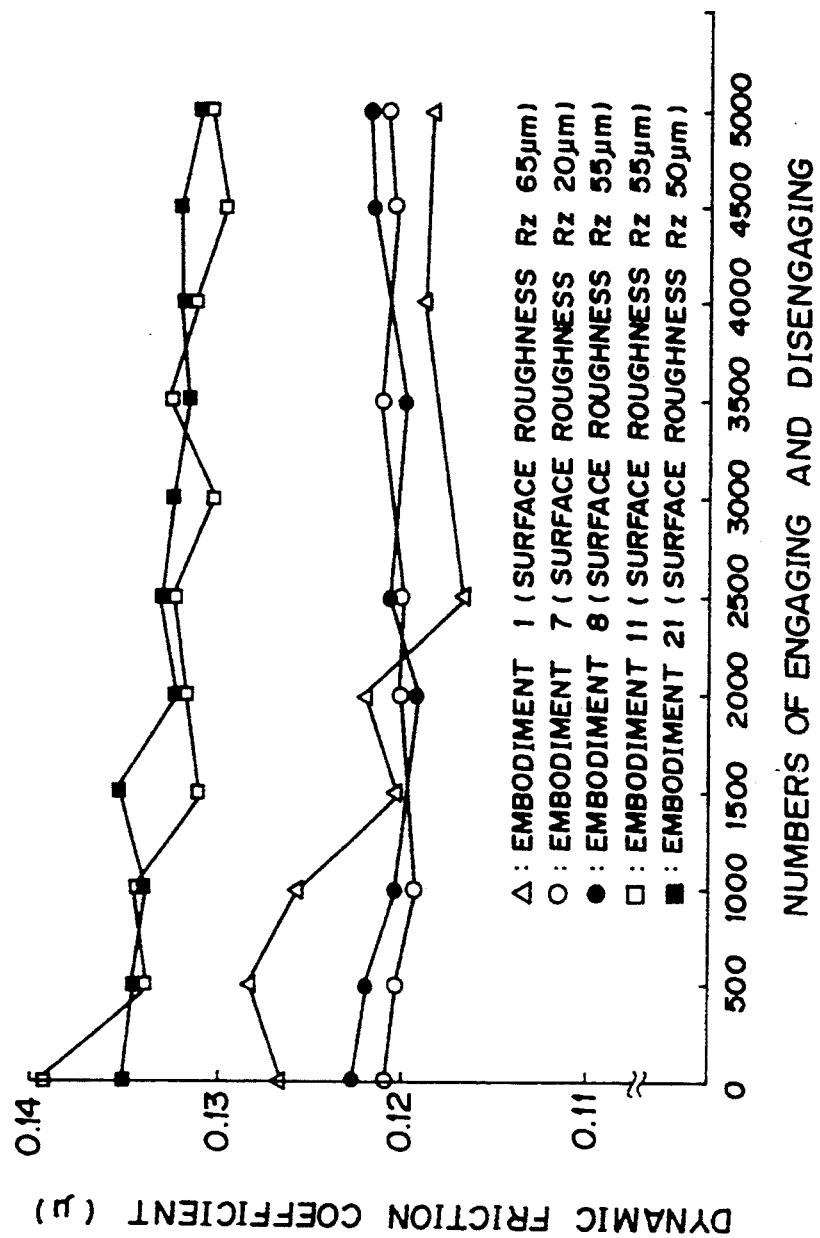
FIG. 4 is a graph showing relationship between surface roughness of the synchronizer ring according to this invention and dynamic friction coefficient thereof.

As can be seen from the Tables 1 to 4, the synchronizer rings manufactured in accordance with the Embodiments of this invention have, in comparison with the synchronizer rings of the Comparative Examples, increased dynamic friction coefficients and improved friction characteristics. Furthermore, the Embodiments provided reduced abrasion quantity, superior abrasion resisting property and high peeling strength of the flame-coated film. The synchronizer rings according to the Embodiments showed stable quality. Furthermore, in the examination of the relationship between the surface roughness and the dynamic friction coefficient in the Embodiments 1, 7, 8, 11 and 21, results such as shown in FIG. 4 were obtained, from which was proved that the dynamic friction coefficient was less lowered when the surface roughness (Rz) was in a range of 20 to 60 μm, and hence, the degradation of the synchronism could be suppressed.

TABLE 1

Material Powder Composition and Friction Characteristic of Flame-coated Film

| | Material Powder Composition (wt %) | | | | | | | Zn-equivalent | Ceramics Addition (wt %) | Hardness of Flame-coated Film (Hv) |
|---|---|---|---|---|---|---|---|---|---|---|
| | Zn | Al | Ni | Si | Fe | Mn | Cu | | | |
| Embodiment 1 | 30.1 | 4.2 | 2.2 | 1.1 | 0.96 | 0.98 | bal | 51.73 | — | 215 |
| Embodiment 2 | 25.1 | 3.3 | 2.2 | 1.1 | 0.51 | 0.98 | bal | 44.69 | — | 175 |
| Embodiment 3 | 44.3 | 4.2 | 2.2 | 1.1 | 0.96 | 0.98 | bal | 63.07 | — | 278 |
| Embodiment 4 | 30.1 | 4.2 | 2.2 | 1.1 | 0.96 | 0.98 | bal | 51.73 | — | 230 |
| Embodiment 5 | 30.1 | 4.2 | 2.2 | 1.1 | 0.96 | 0.98 | bal | 51.73 | — | 225 |
| Embodiment 6 | 30.1 | 4.2 | 2.2 | 1.1 | 0.96 | 0.98 | bal | 51.73 | — | 220 |
| Embodiment 7 | 30.1 | 4.2 | 2.2 | 1.1 | 0.96 | 0.98 | bal | 51.73 | — | 220 |
| Embodiment 8 | 30.1 | 4.2 | 2.2 | 1.1 | 0.96 | 0.98 | bal | 51.73 | — | 235 |
| Embodiment 9 | 30.1 | 4.2 | 2.2 | 1.1 | 0.96 | 0.98 | bal | 51.73 | — | 235 |
| Embodiment 10 | 30.1 | 4.2 | 2.2 | 1.1 | 0.96 | 0.98 | bal | 51.73 | — | 235 |
| Embodiment 11 | 30.1 | 4.2 | 2.2 | 1.1 | 0.96 | 0.98 | bal | 51.73 | 10.0 | 328 |
| Embodiment 12 | 30.1 | 4.2 | 2.2 | 1.1 | 0.96 | 0.98 | bal | 51.73 | 5.0 | 255 |
| Embodiment 13 | 30.1 | 4.2 | 2.2 | 1.1 | 0.96 | 0.98 | bal | 51.73 | 30.0 | 380 |
| Embodiment 14 | 25.1 | 3.3 | 2.2 | 1.1 | 0.51 | 0.98 | bal | 44.69 | 10.0 | 260 |
| Embodiment 15 | 44.3 | 4.2 | 2.2 | 1.1 | 0.96 | 0.98 | bal | 63.07 | 10.0 | 340 |
| Embodiment 16 | 30.1 | 4.2 | 2.2 | 1.1 | 0.96 | 0.98 | bal | 51.73 | 10.0 | 340 |
| Embodiment 17 | 30.1 | 4.2 | 2.2 | 1.1 | 0.96 | 0.98 | bal | 51.73 | 20.0 | 360 |
| Embodiment 18 | 34.3 | 4.2 | 2.2 | 1.1 | 0.96 | 0.98 | bal | 55.08 | 3.0 | 240 |
| Embodiment 19 | 34.3 | 4.2 | 2.2 | 1.1 | 0.96 | 0.98 | bal | 55.08 | 35.0 | 430 |
| Embodiment 20 | 30.1 | 4.2 | 2.2 | 1.1 | 0.96 | 0.98 | bal | 51.73 | 10.0 | 325 |
| Embodiment 21 | 30.1 | 4.2 | 2.2 | 1.1 | 0.96 | 0.98 | bal | 51.73 | 10.0 | 325 |

TABLE 2

Material Powder Composition and Friction Characteristic of Flame-coated Film

| | Hardness of Base (Hv) | Porosity (%) | Flame-coating Thickness (μm) | Surface Roughness (Rz) | Peel Strength (kg/cm$^2$) | Friction Characteristic | | Abrasion Amount | |
|---|---|---|---|---|---|---|---|---|---|
| | | | | | | Dynamic*$^1$ μ | Static*$^2$ μ | Synchronizer Ring | Object Cone |
| Embodiment 1 | — | 20 | 100 | 65 | 93.5 | 0.127 | 0.105 | 5 | 15 |
| Embodiment 2 | — | 20 | 100 | 63 | 89.0 | 0.125 | 0.102 | 8 | 18 |
| Embodiment 3 | — | 20 | 100 | 64 | 85.0 | 0.126 | 0.110 | 4 | 20 |
| Embodiment 4 | — | 5 | 70 | 63 | 96.0 | 0.125 | 0.112 | 5 | 10 |
| Embodiment 5 | — | 30 | 70 | 68 | 82.0 | 0.131 | 0.100 | 5 | 25 |
| Embodiment 6 | — | 20 | 200 | 62 | 88.5 | 0.126 | 0.104 | 7 | 17 |

TABLE 2-continued

| | Material Powder Composition and Friction Characteristic of Flame-coated Film | | | | | | | Abrasion Amount | |
|---|---|---|---|---|---|---|---|---|---|
| | Hardness of Base (Hv) | Porosity (%) | Flame-coating Thickness (μm) | Surface Roughness (Rz) | Peel Strength (kg/cm²) | Friction Characteristic Dynamic*1 μ | Static*2 μ | Synchronizer Ring | Object Cone |
| Embodiment 7 | — | 20 | 100 | 20 | 94.0 | 0.121 | 0.100 | 3 | 9 |
| Embodiment 8 | — | 20 | 200 | 55 | 96.5 | 0.125 | 0.110 | 4 | 12 |
| Embodiment 9 | — | 20 | 100 | 15 | 98.0 | 0.105 | 0.102 | 2 | 6 |
| Embodiment 10 | — | 20 | 100 | 60 | 96.0 | 0.125 | 0.108 | 4 | 13 |
| Embodiment 11 | 215 | 20 | 100 | 55 | 90.5 | 0.133 | 0.108 | 3 | 45 |
| Embodiment 12 | 215 | 15 | 100 | 60 | 95.0 | 0.130 | 0.105 | 10 | 30 |
| Embodiment 13 | 215 | 10 | 100 | 70 | 85.0 | 0.135 | 0.110 | 1 | 75 |
| Embodiment 14 | 175 | 20 | 100 | 65 | 85.0 | 0.130 | 0.103 | 6 | 48 |
| Embodiment 15 | 278 | 20 | 100 | 65 | 82.0 | 0.133 | 0.110 | 2 | 50 |
| Embodiment 16 | 230 | 5 | 70 | 60 | 98.0 | 0.130 | 0.108 | 3 | 40 |
| Embodiment 17 | 225 | 30 | 70 | 75 | 80.0 | 0.135 | 0.102 | 3 | 55 |
| Embodiment 18 | 245 | 25 | 100 | 62 | 90.0 | 0.128 | 0.104 | 25 | 25 |
| Embodiment 19 | 250 | 25 | 100 | 65 | 80.0 | 0.135 | 0.110 | 5 | 110 |
| Embodiment 20 | 215 | 20 | 100 | 15 | 95.0 | 0.130 | 0.100 | 2 | 15 |
| Embodiment 21 | 215 | 20 | 100 | 50 | 92.0 | 0.137 | 0.105 | 3 | 20 |

*1 Dynamic friction coefficient
*2 Static friction coefficient

TABLE 3

| | Material Powder Composition and Friction Characteristic of Flame-coated Film | | | | | | | | | |
|---|---|---|---|---|---|---|---|---|---|---|
| | Material Powder Composition (wt %) | | | | | | | Zn-equivalent | Ceramics Addition (wt %) | Hardness of Flame-coated Film (Hv) |
| | Zn | Al | Ni | Si | Fe | Mn | Cu | | | |
| Embodiment 22 | 30.1 | 4.2 | 2.2 | 1.1 | 0.96 | 0.98 | bal | 51.73 | 10.0 | 320 |
| Comparative Example 1 | 22.5 | 3.5 | 2.2 | 0.7 | 0.96 | 0.98 | bal | 41.47 | — | 160 |
| Comparative Example 2 | 45.3 | 4.8 | 2.2 | 1.1 | 0.96 | 0.98 | bal | 65.18 | — | 295 |
| Comparative Example 3 | 24.3 | 4.2 | 2.2 | 1.1 | 0.96 | 0.98 | bal | 47.10 | — | 230 |
| Comparative Example 4 | 39.3 | 4.2 | 2.2 | 1.1 | 0.96 | 0.98 | bal | 59.08 | — | 275 |
| Comparative Example 5 | 30.1 | 4.2 | 2.2 | 1.1 | 0.96 | 0.98 | bal | 51.73 | — | 220 |
| Comparative Example 6 | 22.5 | 3.5 | 2.2 | 0.7 | 0.96 | 0.98 | bal | 41.47 | 10.0 | 245 |
| Comparative Example 7 | 45.3 | 4.8 | 2.2 | 1.1 | 0.96 | 0.98 | bal | 65.18 | 10.0 | 410 |
| Comparative Example 8 | 24.3 | 4.2 | 2.2 | 1.1 | 0.96 | 0.98 | bal | 47.10 | 10.0 | 360 |
| Comparative Example 9 | 39.3 | 4.2 | 2.2 | 1.1 | 0.96 | 0.98 | bal | 59.08 | 10.0 | 280 |
| Comparative Example 10 | 30.1 | 4.2 | 2.2 | 1.1 | 0.96 | 0.98 | bal | 51.73 | 10.0 | 325 |
| Comparative Example 11 | 30.1 | 4.2 | 2.2 | 1.1 | 0.96 | 0.98 | bal | 51.73 | 10.0 | 320 |
| Comparative Example 12 | 29.0 | 3.0 | Others: 20.0 | | 3.0 | | bal | — | — | (162) |

TABLE 4

| | Material Powder Composition and Friction Characteristic of Flame-coated Film | | | | | | | Abrasion Amount | |
|---|---|---|---|---|---|---|---|---|---|
| | Hardness of Base (Hv) | Porosity (%) | Flame-coating Thickness (μm) | Surface Roughness (Rz) | Peel Strength (kg/cm²) | Friction Characteristic Dynamic*1 μ | Static*2 μ | Synchronizer Ring | Object Cone |
| Embodiment 22 | 220 | 20 | 200 | 58 | 82.0 | 0.133 | 0.108 | 4 | 30 |
| Comparative Example 1 | — | 20 | 100 | 70 | 73.0 | 0.120 | 0.105 | 20 | 12 |
| Comparative Example 2 | — | 20 | 100 | 69 | 67.5 | 0.115 | 0.112 | 5 | 60 |
| Comparative Example 3 | — | 4 | 100 | 65 | 81.0 | 0.111 | 0.110 | 15 | 10 |
| Comparative Example 4 | — | 35 | 100 | 70 | 78.0 | 0.125 | 0.105 | 20 | 5 |
| Comparative Example 5 | — | 20 | 250 | 65 | 79.5 | 0.129 | 0.110 | 6 | 10 |
| Comparative Example 6 | 160 | 20 | 100 | 65 | 75.0 | 0.125 | 0.111 | 20 | 35 |
| Comparative Example 7 | 295 | 20 | 100 | 65 | 65.0 | 0.120 | 0.110 | 2 | 90 |
| Comparative Example 8 | 230 | 4 | 100 | 60 | 78.0 | 0.115 | 0.105 | 15 | 40 |

TABLE 4-continued

| | Material Powder Composition and Friction Characteristic of Flame-coated Film | | | | | | | Abrasion Amount | |
|---|---|---|---|---|---|---|---|---|---|
| | Hardness of Base (Hv) | Porosity (%) | Flame-coating Thickness (μm) | Surface Roughness (Rz) | Peel Strength (kg/cm²) | Friction Characteristic | | Synchronizer Ring | Object Cone |
| | | | | | | Dynamic*1 μ | Static*2 μ | | |
| Comparative Example 9 | 275 | 35 | 100 | 65 | 75.0 | 0.130 | 0.100 | 20 | 30 |
| Comparative Example 10 | 220 | 20 | 65 | 65 | 110.0 | 0.128 | 0.108 | 15 | 35 |
| Comparative Example 11 | 220 | 20 | 250 | 55 | 76.0 | 0.135 | 0.110 | 4 | 40 |
| Comparative Example 12 | — | — | — | — | — | 0.103 | 0.110 | 14 | 25 |

*1 Dynamic friction coefficient
*2 Static friction coefficient

What is claimed is:

1. A synchronizer ring for synchronous sliding with and separating from an object member, comprising:
    a ring body having a sliding surface for slidable contact with the object member; and
    a flame-coated film formed on the sliding surface, said flame-coated film comprising a copper alloy having a Zn equivalent of 40 to 65 and a hardness (Hv) of 170 to 280.

2. The synchronizer ring of claim 1, wherein the Zn equivalent is 45 to 55.

3. The synchronizer ring of claim 1, wherein the flame-coated film has a surface porosity of 5 to 30%.

4. The synchronizer ring of claim 3, wherein the surface porosity of the flame-coated film is 10 to 25%.

5. The synchronizer ring of claim 1, wherein the flame-coated film has a thickness of 70 to 200 μm.

6. The synchronizer ring of claim 5, wherein the thickness of the flame-coated film is 90 to 120 μm.

7. The synchronizer ring of claim 1, wherein the flame-coated film has a surface roughness (Rz) of 20 to 60 μm.

8. The synchronizer ring of claim 7, wherein the surface roughness is 30 to 55 μm.

9. A synchronizer ring for synchronous sliding with and separating from an object member, comprising:
    a ring body having a sliding surface for a slidable contract with the object member; and
    a flame-coated film formed on the sliding surface, said flame-coated film comprising a copper alloy having a Zn equivalent of 40 to 65 and 5 and 30 weight % ceramic material.

10. The synchronizer ring of claim 9, wherein the ceramic material is present in an amount of 7 to 20 wt %.

* * * * *